United States Patent [19]

Shiozu et al.

[11] 4,378,578
[45] Mar. 29, 1983

[54] MODE CONTROL DEVICE FOR TAPE RECORDERS

[75] Inventors: Yukimasa Shiozu; Tadahisa Iwasaki, both of Tokorozawa, Japan

[73] Assignee: Pioneer Ansafone Manufacturing Corporation, Saitama, Japan

[21] Appl. No.: 224,763

[22] Filed: Jan. 13, 1981

[30] Foreign Application Priority Data

| Jan. 14, 1980 | [JP] | Japan | 55-2715[U] |
| Jan. 14, 1980 | [JP] | Japan | 55-2716[U] |
| Jan. 14, 1980 | [JP] | Japan | 55-2717[U] |
| Jan. 14, 1980 | [JP] | Japan | 55-2718[U] |
| Jan. 14, 1980 | [JP] | Japan | 55-2719[U] |
| Jan. 14, 1980 | [JP] | Japan | 55-2720[U] |

[51] Int. Cl.³ .................. G11B 15/10; G11B 15/24; G11B 19/26
[52] U.S. Cl. .................. 360/137; 360/96.3; 360/105
[58] Field of Search .......... 360/137, 105, 90, 93, 360/96.1–96.4; 242/197–200

[56] References Cited

U.S. PATENT DOCUMENTS

| 4,014,041 | 3/1977 | Cicatelli | 360/105 |
| 4,101,949 | 7/1978 | Cicatelli | 360/105 |
| 4,149,203 | 4/1979 | Kobayashi et al. | 360/105 |
| 4,175,273 | 11/1979 | Nakamura | 360/137 |
| 4,227,222 | 10/1980 | Sato et al. | 360/137 |
| 4,227,226 | 10/1980 | Tashiro | 360/105 |
| 4,232,349 | 11/1980 | Kobayashi | 360/105 |
| 4,301,485 | 11/1981 | Takanashi | 360/137 |

*Primary Examiner*—Alfred H. Eddleman
*Attorney, Agent, or Firm*—Sughrue, Mion, Zinn, Macpeak and Seas

[57] ABSTRACT

A mode control device for a cassette tape recorder in which operational functions are combined with a small number of operational buttons or keys. A slidably-mounted electric source operation lever operates an electric source switch and also is slidable to a position causing the ejection of a tape cassette. A slidably-mounted function lever operates in conjunction with the electric source operation lever to change a tape drive between recording, stop, playback and rewinding modes with the function lever being prevented from operating during the OFF state of the electric source operation lever. When the electric source operation lever is at an ON position and the function lever is in a stop mode position, a magnetic recording and erase head and a pinch roller are in a position close to their respective contact positions so that the required manual force for moving to the recording or playback modes is quite small.

3 Claims, 13 Drawing Figures

MODE CONTROL DEVICE FOR TAPE RECORDERS

BACKGROUND OF THE INVENTION

The present invention relates to a mode control device for tape recorders, particularly for dictating machines.

There have heretofore been provided various control devices for controlling the operational modes of tape recorders. For example, a so-called piano-key type in which keys are depressed and a pushbutton type are well known.

However, in the prior art control devices, each pushbutton or key corresponds only to a single functional mode. Accordingly, a number of pushbuttons or keys must be provided. This requires a complicated and sometimes inconvenient operation. That is, it is necessary to select a single desired button or key after visual confirmation that the button or key corresponds to the desired operational mode. Furthermore, although recently a large degree of miniaturization of tape recorders has been achieved, the need for plural buttons or keys has hitherto made it impossible to further miniaturize tape recorders. This is due to the fact that if the buttons or keys are made smaller than a size which is convenient for the human finger, the operationability of the tape recorder deteriorates.

Therefore, it is an object of the present invention to provide a compact mode control device for tape recorders, particularly for dictating machines, which is superior in operationability and can be easily manipulated with one hand.

SUMMARY OF THE INVENTION

In accordance with this and other objects of the invention, there is provided a mode control device for a tape recorder, specifically a dictating machine, including an electric source operation lever for setting an ON-OFF operation of an electric source switch of the recorder. This lever is movable between first, second and third positions corresponding to ON-OFF and ejection. A function lever is provided for changing tape driving means between recording, stop, playback and rewinding mode positions. Means are provided for preventing the function lever from moving in the OFF state position of the electric source switch. Also, means is provided for preventing the position of the electric source switch from being changed from the ON position to the OFF position thereof in the recording, playback and rewinding mode positions of the function lever. The function lever is biased by a spring in the playback mode position from the rewinding mode position. A fast-forward lever sets the tape driving means in and out of the fast-forward mode. Means is provided for preventing the fast-forward lever from operating when the function lever is positioned in one of the recording and rewinding mode positions. Magnetic heads for recording and playback are mounted on a slidably-mounted plate and a pinch roller is rotatably mounted upon a rotatable lever. The plate upon which the magnetic heads are mounted and the rotatable lever upon which the pinch roller is mounted are controlled in accordance with the positions of the electric source operation lever and function lever.

DESCRIPTION OF THE PREFERRED EMBODIMENTS

Figure 1A:
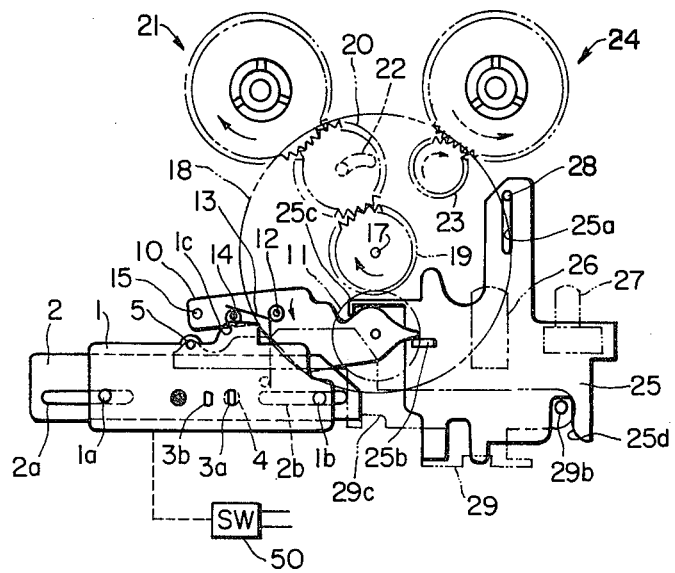
FIGS. 1A and 1B are schematic plan views of a preferred embodiment of a mode control device of the invention in an OFF and in an ON state, respectively.
Figure 1B:
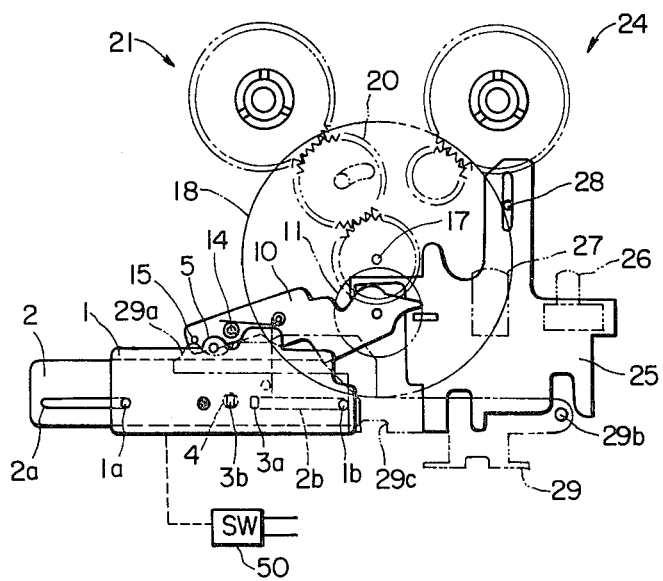
Figure 2:
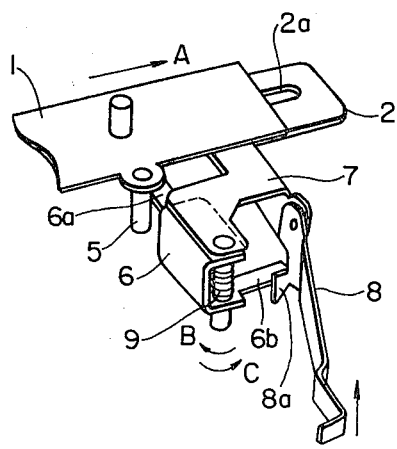
FIG. 2 is a perspective view of a portion of the mode control device shown in FIGS. 1A and 1B.

FIGS. 1A and 1B are schematic plan views showing a preferred embodiment of a mode control device of the present invention. FIGS. 1A and 1B correspond to an electric source OFF-state and an electric source ON-state, respectively, in which an electric source operation lever 1 for an ON-OFF setting of an electric source switch 50 and also for ejection of a tape cassette is so constructed that it can be placed at positions corresponding to both ON and OFF states of the electric source and at an eject position beyond the OFF position. Pins 1a and 1b rigidly coupled to the source operation lever 1 are slidingly disposed in guide slots 2a and 2b, respectively, in a slide plate 2 whereby the lever 1 is slidable thereon. Lock holes 3a and 3b, corresponding respectively to the source ON and OFF positions, are formed in the operation lever 1. The lock holes 3a and 3b are each engageable with a steel ball which is provided on the slide plate, which is biased upwardly and with which the lever 1 can be retained in the ON or OFF position. Further, an engagement pin 5 affixed to the lever 1 abuts against an arm 6a of a rotational member 6 as best shown in FIG. 2. The rotational member 6 is rotatably supported by a support 7 integrally formed with the slide plate 2. When the lever 1 is manually moved in the direction of the arrow A, that is, in the EJECT direction, the rotational member 6 is rotated in the direction of the arrow B. Another arm 6b of the rotational member 6 abuts against an engagement end 8a of a rotational arm 8. The other end of the rotational member 8 is engaged with a cassette holder (not shown) adapted to receive a cassette. By rotation of the rotational member 6 in the direction of the arrow B, the cassette holder is driver to raise its end to thereby eject the cassette. The lever 1 is so constructed that it is disengaged from the lock structure at the EJECT position. The rotational member 6 is biased in the direction of the arrow C by a spring 9. Accordingly, upon release of the manual force, the rotational member 6 is returned to the OFF position.

A pinch roller 11 is rotatably supported by a pinch lever 10 which is rotatably supported by a shaft 12 fixed to the chassis. The pinch lever 10 is biased counterclockwise by a spring 13. In the OFF state (FIG. 1A), an engagement pin 14 affixed to the pinch lever 10 is engaged with a cam portion 1c of the source operation lever 1 as shown in FIG. 1A. As contrasted thereto, in the ON state (FIG. 1B), the engagement pin 14 is disengaged from the cam portion 1c of the operation lever 1 and the pinch lever 10 is rotated counterclockwise by the spring 13. This rotation is stopped by engagement between a function lever 29 (described below) and an engagement pin 15 fixed to the pinch lever 10. The pinch roller 11 in this state is located close to a capstan 17 but is not in contact with the capstan 17.

The capstan 17 is rotatably mounted on the chassis and is provided at a lower portion with a flywheel 18. Preferably, the capstan 17 is rotated in the clockwise direction by belt drive means (not shown). A gear 19 is coaxially secured to the flywheel 18. The rotational torque thereof is transmitted through an idler gear 20 to a take-up reel unit 21. Accordingly, the take-up reel unit 21 is rotated in the clockwise direction and thereby the tape is taken up in the recording, playback and fast-forward operation. The idler gear 20 is loosely engaged with a guide slot 22 formed in a sub-chassis and in the rewinding mode is driven in engagement with an idler gear 23 so that the rotational torque of the flywheel 18 is transmitted through the idler gear 23 to a feed reel unit 24. In this case, the feed reel unit rotates counterclockwise.

On a magnetic head plate 25 are mounted a recording and playback head 26 and erasing head 27. A pin 28 secured to the chassis is slidably engaged in a guide slot 25a formed in the head plate 25 so that the head plate 25 is movable up and down. In the OFF state, the head plate 25, having engagement portions 25b and 25c, is moved downwardly to the position shown in FIG. 1A by the abutment of the portion 25b against the end portion of the pinch lever 10. In the ON state, the engagement portion 25c is moved upwardly to the position shown in FIG. 1B by the pinch lever 10 rotating in the counterclockwise direction so that the head plate 25 is moved closed to a position where the heads 26 and 27 are in contact with the magnetic tape surface.

Figure 3:
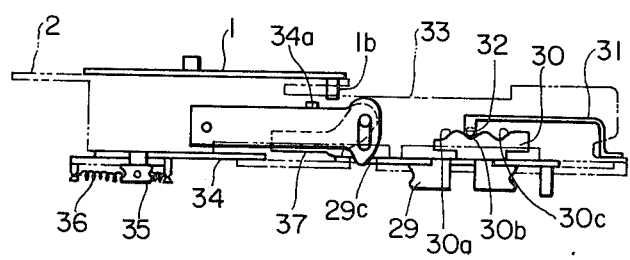
FIG. 3 is a top view showing a locking lever structure used in the control device of FIGS. 1A and 1B.

A function lever 29 is used in mode changeover such as between recording, stop, playback and rewinding modes. The function lever 29 is freely movable rightwardly and leftwardly with respect to the chassis. The function lever 29 is provided with an upper corrugated cam 30 which engages with a roller 32 resiliently mounted on the chassis through a spring 31 as shown in FIG. 3. Accordingly, the function lever 29 is held in position by the engagement between the roller 32 and the corrugated concave areas 30a, 30b and 30c of the cam 30 with the concave areas 30a, 30b and 30c corresponding to the recording, stop and playback modes. The function lever 29 is provided at an end portion with a corrugated cam portion 29a which engages with the engagement pin 15 of the pinch lever 10 and is provided at the other end portion with an engagement pin 29b which engages with the head plate 25. The engagement pin 29b, in the OFF state, engages with a concave portion 25d of the head plate 25b as shown in FIG. 1A to thereby prevent lateral movement of the function lever 29.

Figure 4A:
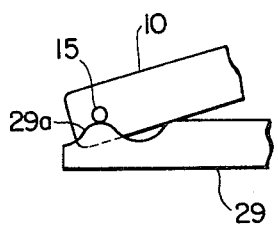
FIGS. 4A-4F are a series of plan views showing portions of the control device of FIGS. 1A and 1B in various positions.
Figure 4B:
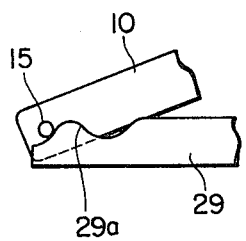
Figure 4C:
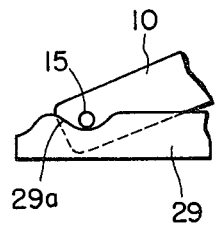
Figure 4D:
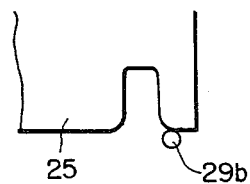
Figure 4E:
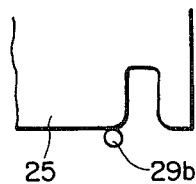
Figure 4F:
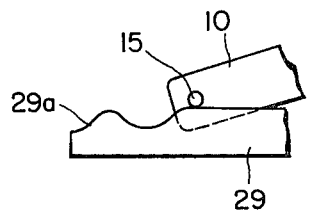

In the ON state, since the head plate 25 is moved to the position shown in FIG. 1B, the function lever 29 is then movable. In the stop mode, the convex portion of the cam 29a of the function lever 29, as shown in FIG. 4A, is engaged with the engagement pin 15 of the pinch lever 10 to thereby restrict the rotational movement of the pinch lever 10 to thereby prevent the pinch roller 11 from contacting the capstan 17. In the recording or playback mode, as illustrated in FIG. 4B or FIG. 4C, since the engagement pin 15 of the pinch lever 10 is engaged with the concave area of the cam portion 29a, the pinch lever 10 is further rotated to thereby press the pinch roller 11 against the capstan 17. At the same time, the engagement pin 29b at the end portion of the function lever 29 as shown in FIGS. 4D and 4E engages with the head plate 25 thereby moving the head plate upwardly to press the heads 26 and 27 against the tape. When the function lever 29 is moved from the playback mode position to the rewinding mode position, as shown in FIG. 4F, the engagement pin 15 of the pinch lever 10 is engaged with the level portion of the cam portion 29a of the function lever 29. As a result, the pinch lever 10 is slightly rotated in the clockwise direction thereby disengaging the pinch roller 11 from the capstan 17. It should be noted that in the rewinding mode, the function lever 29 is not locked and is biased towards the playback mode position. As a result, without the application of externally applied manual force, the function lever is moved to the playback mode position and is locked thereat. Even in the rewinding mode, reproduction is effected because the head plate is advanced.

Figure 5:
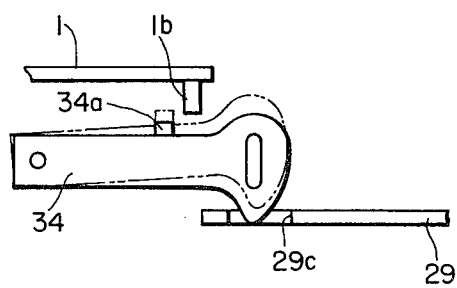
FIG. 5 is a top plan view showing the locking lever mechanism of FIG. 3 in more detail.

In FIG. 3, a locking lever 34 is rotatably supported by a fixed plate 33 which is rigidly connected to the slide plate 2. The locking lever 34 serves to prevent the electric source operation lever 1 from moving from the ON position to the OFF position when the function lever 29 is placed at the recording, playback, or rewinding mode position. Namely, as shown in FIG. 5, when the function lever 29 is positioned at the stop mode position, a projecting end of the locking lever 34 is engaged with the concave area of the function lever 29 at the bottom dead center thereof so that an engagement member 34a formed at the upper portion of the locking lever 34 does not block the pin 1b, whereas in the recording, playback and rewinding modes, the locking lever 34 is moved or rotated by the function lever 29 up to the top dead center position as shown by the single-dash lines thereby bringing the engagement member 34a to an abutting position against the pin 1b to thus prevent the operation of the source operation lever 1.

Figure 6A:
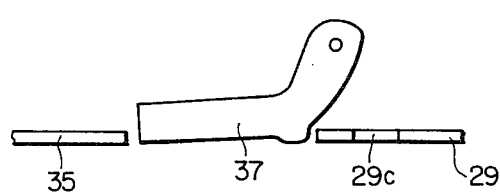
FIGS. 6A and 6B show details of a locking plate and fast-forward lever used in the control device of FIGS. 1A and 1B.
Figure 6B:
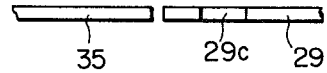

A fast-forward lever 35 (FIG. 3) for allowing the tape drive means to be placed in the fast-forward mode is slidably mounted on the right-hand side on the chassis and is urged leftwardly by a coil spring 36. The fast-forward lever 35 co-acts with drive means (not shown). In the stop mode, the fast-forward lever 35 is moved rightwardly as a result of which a brake of the feed reel unit 24 is released and the motor (not shown) for driving the flywheel 18 is activated. It is to be noted that, in the stop mode, contact between the pinch roller 11 and the capstan 17 and between the heads 26 and 27 and the tape is released. Also, when the function lever 29 is placed at the playback position and the fast-forward lever 35 is depressed, the motor is driven at a high speed with the pinch roller 11 contacting the capstan 17 and with the heads 26 and 27 contacting the tape. On the other hand, when the function lever 29 is placed in either the recording or rewinding modes, the fast-forward lever 35 is prevented from operating by the locking plate 37 (FIG. 3) and by the function lever 29. Namely, when the function lever 29 is moved to the recording mode position, the locking plate 37 which has been, in the stop or playback mode position, abutted against the function lever 29 is rotated counterclockwise, whereby as shown in FIG. 6A the movement of the fast-forward lever 35 is prevented by an end of the locking plate 37. On the other hand, in the rewinding mode, the end of the function lever 29 is, as shown in FIG. 6B, moved close to the end of the fast-forward lever 35 to thereby prevent the operation of the fast-forward lever 35.

With the mode control device constructed as described above, the ejection operation can be achieved only after the electric source switch is OFF thereby preventing misoperation during the ejection operation. Also, with the construction described, the mode control device can be operated with one hand.

Yet further, with the control device constructed as described above, a desired portion of a tape can be easily played back repeatedly by a single action. Also, the fast-forward lever is prevented from moving in both the recording and rewind mode positions. Still further, the mode control device of the invention is advantageous in that, when the electric source operation lever is in the ON position, the heads and the pinch roller are moved close to their contact positions so that the required operation for moving from the ON position to the record and playback mode positions can be readily achieved with only a very small manual force.

What is claimed is:

1. A mode control device for a tape recorder comprising: an electric source operation lever and a slide plate, said electric source operation lever being slidably mounted upon said slide plate; locking means for retaining said electric source operation lever at ON, OFF and eject positions thereof; a first engagement pin rigidly coupled to a side portion of said electric source operation lever; a rotational member rotatably supported upon said slide plate, said rotational member being rotatable in a plane parallel to a plane of said electric source operation lever, an arm of said rotational member abutting against said first engagement pin when said electric source operation lever is moved from said OFF position to said eject position thereby rotating said rotational member to a predetermined rotational position; a rotatable arm rotatably in a plane perpendicular to said plane of said electric source operation lever, said rotatable arm being disposed to rotate in response to rotation of said rotational member wherein a tape cassette is ejected when said electric source operation lever is moved from said OFF position to said eject position; a spring for biasing said rotational member in a direction toward the position of said rotational member when said electric source operation lever is in said OFF position; a rotatably mounted pinch lever; a pinch roller rotatably mounted on said pinch lever; a second engagement pin engaged with a cam surface formed on one side of said electric source operation lever in said OFF position of said electric source operation lever and disengaged from said cam portion of said electric source operation lever is said ON position of said electric source operation lever; a spring for urging said second engagement pin into engagement with said cam portion of said electric source operation lever, said pinch roller being located close to a capstan but slightly removed from said capstan in said ON position; a magnetic head plate slidably mounted to slide in a direction perpendicular to the direction in which said electric source operation lever is slidable; a recording and playback head and an erasing head mounted on said magnetic head plate; said magnetic head plate having a first engagement portion engaged with an end portion of said pinch lever and a second engagement portion engaged with a cam surface formed on one side of said pinch lever wherein, when said electric source operation lever is in said ON position, said pinch lever is in a position such that said heads are in contact with the surface of a magnetic tape; a function lever for changing between recording, stop, playback and rewinding modes, said function lever being slidably mounted in the same direction as said electric source operation lever, said function lever having an upper corrugated cam; a roller fixedly mounted upon a chassis upon which said slide plate is mounted, said roller being resiliently engaged with said corrugated cam of said function lever to retain said function lever in positions corresponding to recording, stop and playback modes, said function lever having a corrugated cam portion formed on an end portion thereof; a third engagement pin rigidly coupled to said pinch lever and engaged with said corrugated cam portion of said function lever; a fourth engagement pin for engaging a concave portion formed in said head plate to prevent lateral movement of said function lever in said OFF position of said electric source operation lever whereby rotational movement of said pinch lever is restricted to prevent said pinch roller from contacting against a capstan in said OFF position; a locking lever and fixed plate with said fixed plate being rigidly connected to said slide plate and said locking lever being rotatably supported by said fixed plate, said locking lever having a projecting end portion for engaging with a concave area of said function lever in said stop mode position and said locking lever having an engagement member blocking a fifth engagement pin rigidly coupled to said electric source operation lever to prevent operation of said electric source operation lever when said function lever is in one of said recording, playback and rewinding mode positions; a fast-forward lever for setting tape drive means in and out of a fast-forward mode, said fast-forward lever being slidably mounted upon said chassis; and a locking plate coupled to said function lever for preventing operation of said fast-forward lever except when said function lever is in one of said stop and playback mode positions.

2. A mode control device for a cassette tape recorder including an electric source switch, tape driving means and ejection means for ejecting a tape cassette, the device comprising:

electric source operation lever means for determining an ON/OFF operation of said switch, said lever means being manually slidable in a plane between first and second positions which corresponds respectively to ON and OFF states of said switch, and said lever means being further slidable in said plane to a third position opposite to said second position with respect to said first position;

means actuated by said lever means in said third position for operating said ejection means to eject the cassette;

manually operated function lever means operable to place said tape driving means in at least one of recording, stop, playback and rewinding mode positions;

and means actuated by said source operation lever means in said OFF position for preventing said function lever means from operating;

means actuated by said function lever means for preventing said electric source operation lever means from changing from the ON position to an OFF position in said recording, playback and rewinding mode position of said function lever means;

manually operated fast-forward lever means for setting said driving means in a fast-forward mode; and means for preventing said fast-forward lever means from operating when said function lever means is positioned in one of said recording and rewinding mode positions.

3. A mode control device as defined in claim 2 further comprising:

magnetic heads movable in and out of a position in contact against a tape in recording and playback modes;

a pinch roller movable so as to press against a capstan; and means for moving said magnetic heads and said pinch roller wherein, in the ON position of said electric source operation lever means, said magnetic heads and said pinch roller are moved close to positions where said magnetic heads and said pinch roller are in contact with said tape and said capstan, respectively.

* * * * *